United States Patent
Saavedra

(10) Patent No.: US 11,277,054 B2
(45) Date of Patent: Mar. 15, 2022

(54) POWER GENERATING SYSTEM USING INDUCED CURRENTS FROM VEHICLE WHEEL ROTATION

(71) Applicant: Look For The Power LLC, Irmo, SC (US)

(72) Inventor: John Alan Saavedra, Irmo, SC (US)

(73) Assignee: Look For The Power LLC, Irmo, SC (US)

( * ) Notice: Subject to any disclaimer, the term of this patent is extended or adjusted under 35 U.S.C. 154(b) by 0 days.

(21) Appl. No.: 16/182,986

(22) Filed: Nov. 7, 2018

(65) Prior Publication Data

US 2020/0144893 A1   May 7, 2020

(51) Int. Cl.
*H02K 7/18* (2006.01)
*B60K 7/00* (2006.01)
(Continued)

(52) U.S. Cl.
CPC ......... *H02K 7/1846* (2013.01); *B60K 7/0007* (2013.01); *H02K 11/0094* (2013.01);
(Continued)

(58) Field of Classification Search
CPC .. H02K 7/1846; H02K 11/0094; H02K 7/106; H02K 1/2793; B60L 50/50; H02P 2101/00
(Continued)

(56) References Cited

U.S. PATENT DOCUMENTS 3,993,360 A * 11/1976 Greene ............... B60T 1/06
                                                      303/3
4,521,731 A *  6/1985 Uyeda ................ G01P 3/487
                                                      280/288.4
(Continued)

FOREIGN PATENT DOCUMENTS

EP         1165361 B1 * 10/2004 ............... B62J 6/06
EP         2121421 B1 * 11/2012 ............... B62J 6/06
WO   WO-2015040544 A2 *  3/2015 ............. H02K 7/102

OTHER PUBLICATIONS

Evans Electric, "Volvo Electric Car Recharge Concept hybrid In-Wheel Motor EV," https://www.youtube.com/watch?v=kmJTsHcZMFQ, Sep. 6, 2007.
(Continued)

*Primary Examiner* — Tulsidas C Patel
*Assistant Examiner* — Robert E Mates
(74) *Attorney, Agent, or Firm* — Dority & Manning, P.A.

(57) ABSTRACT

Vehicles with integrated power generation produced by rotation of the wheels are provided. In exemplary implementations, a vehicle includes a frame, a wheel assembly coupled to the frame, and a power generating unit. The wheel assembly includes a wheel defining a wheel axis. The wheel is configured to rotate about the wheel axis during operation of the vehicle. The wheel assembly further includes supporting components fixed about the wheel axis during operation of the vehicle. The power generating unit includes a rotating assembly rotatable with the wheel about (Continued)

the wheel axis, including at least one of a magnet assembly or a coil assembly, and, also includes a stationary assembly mounted to at least one of the supporting components of the wheel assembly or the frame and including the other of the magnet assembly or the coil assembly such that rotation of the wheel rotates the rotating assembly relative to the stationary assembly for generating electrical power.

11 Claims, 7 Drawing Sheets

(51) Int. Cl.
  *H02K 11/00* (2016.01)
  *B60L 50/50* (2019.01)
  *B60K 6/26* (2007.10)
(52) U.S. Cl.
  CPC ............... *B60K 6/26* (2013.01); *B60L 50/50* (2019.02); *B60L 2200/12* (2013.01); *B60L 2200/28* (2013.01); *B60Y 2200/13* (2013.01); *B60Y 2200/148* (2013.01); *B60Y 2200/91* (2013.01); *B60Y 2200/92* (2013.01); *B60Y 2400/60* (2013.01)
(58) Field of Classification Search
  USPC ............. 310/67 R, 76, 77, 78, 92, 93, 102 R
  See application file for complete search history.

(56) References Cited

U.S. PATENT DOCUMENTS

| | | | | |
|---|---|---|---|---|
| 5,325,901 A * | 7/1994 | Olney | ................. | B60C 23/0408 152/418 |
| 5,959,365 A * | 9/1999 | Mantini | ............. | B60C 23/0408 180/197 |
| 7,122,923 B2 | 10/2006 | Lafontaine et al. | | |
| 7,466,049 B1 * | 12/2008 | Vancea | .................... | B60K 6/46 310/750 |
| 8,700,239 B2 | 4/2014 | Perry et al. | | |
| 9,061,731 B1 * | 6/2015 | Do | ........... | B62M 6/80 |
| 2009/0166106 A1 * | 7/2009 | Batdorf | .................... | B60K 6/48 180/24.06 |
| 2011/0031849 A1 * | 2/2011 | Hsueh | ........................ | B62J 6/06 310/67 R |
| 2011/0227425 A1 * | 9/2011 | Sohn | .................. | B60G 17/0157 310/17 |
| 2012/0123646 A1 * | 5/2012 | Mantini | ............... | B60G 17/019 701/48 |
| 2014/0042752 A1 * | 2/2014 | McDermott | .......... | H02K 21/22 290/1 R |
| 2015/0008799 A1 * | 1/2015 | Okuda | .................... | B60B 35/18 310/67 R |
| 2015/0295455 A1 * | 10/2015 | Nemoto | ................. | H02K 21/14 310/216.094 |
| 2017/0254632 A1 * | 9/2017 | Liu | ........................ | G01B 21/12 |

OTHER PUBLICATIONS

Mark Williams, "Electric Trucks may Shift EV Perceptions," http://news.pickuptrucks.com/2012/03/electric-trucks-mav-shift-ev-perceptions.html, Mar. 28, 2012.

John McCabe, "The First Porsche: Ahead of its Time," https://www.drivingline.com/articles/the-first-porsche-ahead-of-its-time/, Jun. 12, 2015.

Danny King, "Protean Electric shows off productions-ready in-wheel electric-drive system," https://www.autoblog.com/2013/04/17/protean-electric-production-ready-in-wheel-electric-drive/, Apr. 13, 2017.

* cited by examiner

POWER GENERATING SYSTEM USING INDUCED CURRENTS FROM VEHICLE WHEEL ROTATION

FIELD

This disclosure relates generally to systems and methods for generating power on a vehicle, and more specifically to vehicles with integrated power generation.

BACKGROUND

In recent times, hybrid-electric and fully electric vehicles have become much more prevalent, and technological developments have allowed for great strides to be made in the practicality of such vehicles. For example, hybrid-electric vehicles have been developed that facilitate higher fuel economies than would otherwise be available in traditional combustion engine powered vehicles. Additionally, fully electric vehicles have been developed that may allow for even greater efficiencies, utilizing, of course, solely electric power. In addition to the efficiencies associated with using electric power, the electrical power provided to the vehicles may be generated through sustainable or renewable means, such as through wind turbines, solar panels, etc.

Additionally, Kinetic Energy Recovery Systems (KERS) have been implemented in some conventionally powered and electrically powered vehicles. Existing KERS systems use flywheels, either mounted on the same drive shaft as the motor or internal combustion engine, or on the wheels themselves. These flywheels add weight, parts, and complexity to the vehicle.

An additional problem with current fully electric vehicles is the available driving range for the vehicle. Despite improvements in this area, further improvements would be welcomed. Accordingly, a system capable of increasing a driving range of a fully electric vehicle, or increasing a fuel economy of a hybrid-electric vehicle, would be useful. Furthermore, a system capable of reducing the size, weight, and cost of an alternator in a conventionally-powered internal combustion vehicle, would also be useful.

BRIEF DESCRIPTION

Aspects and advantages of embodiments of the present disclosure will be set forth in part in the following description, or may be learned from the description, or may be learned through practice of the embodiments.

One exemplary aspect of the present disclosure is directed to a vehicle with integrated power generation using induced currents from vehicle wheel rotation. The vehicle includes a frame, a wheel assembly coupled to the frame, and a power generating unit. The wheel assembly includes a wheel defining a wheel axis. The wheel is configured to rotate about the wheel axis during operation of the vehicle. The wheel assembly further includes supporting components fixed about the wheel axis during operation of the vehicle. The power generating unit includes a rotating assembly rotatable with the wheel about the wheel axis, including at least one of a magnet assembly or a coil assembly, and, also includes a stationary assembly mounted to at least one of the supporting components of the wheel assembly or the frame and including the other of the magnet assembly or the coil assembly such that rotation of the wheel rotates the rotating assembly relative to the stationary assembly for generating electrical power.

Other exemplary aspects of the present disclosure can include apparatus, systems, methods, control systems, and other technology for vehicles with integrated power generation using induced currents from vehicle wheel rotation.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
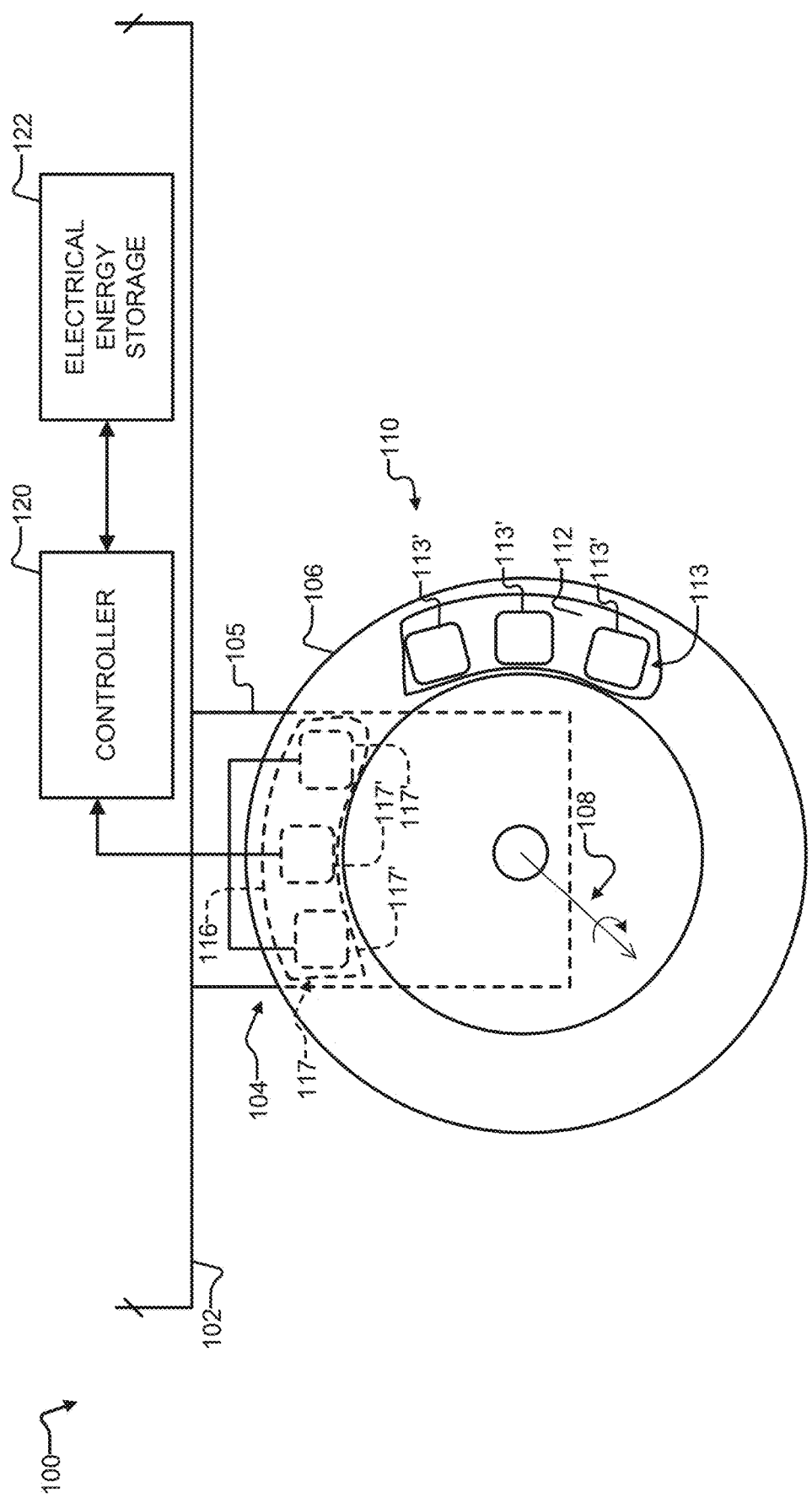
FIG. 1 is a schematic of a portion of a vehicle with integrated power generation using induced currents from vehicle wheel rotation, according to exemplary embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Exemplary aspects of the present disclosure are directed to vehicles with integrated power generation using induced currents from vehicle wheel rotation. According to one aspect, a vehicle includes a frame, a wheel assembly coupled to the frame, and a power generating unit. The wheel assembly includes a wheel defining a wheel axis. The wheel is configured to rotate about the wheel axis during operation of the vehicle. The wheel assembly further includes supporting components fixed about the wheel axis during operation of the vehicle. It is noted that tires, bearings, brakes, and other components are not specifically called out for simplicity.

According to this aspect, the power generating unit includes a rotating assembly rotatable with the wheel about the wheel axis, and including at least one of a magnet assembly or a coil assembly. The magnet assembly may have one or more magnets, including many magnets. The coil assembly may have one or more coils, including many coils.

The power generating unit also includes a stationary assembly mounted to at least one of the supporting components of the wheel assembly or the frame. The stationary assembly includes the other of the magnet assembly or the coil assembly. Accordingly, rotation of the wheel rotates the rotating assembly relative to the stationary assembly for generating electrical power through the coils. For example, if the coils are stationary, electrical leads from the coils can be accessed to receive electrical power. Alternatively, if the coils are on the rotating assembly, a set of electrical brushes can be used near the wheel axis to access and receive electrical power.

The power generated through the rotating and stationary assemblies may be selectively controlled with a controller, for example, a dedicated controller or simplified computer apparatus. The selective control may include turning the power generating unit completely off, turning the power generating unit completely on, and selectively turning the unit on/off in varying circumstances. Furthermore, one or more electrical energy storage units can be used to store the received electrical power for use onboard the vehicle or otherwise.

Referring now to the figures, FIG. 1 is a schematic of a portion of a vehicle 100 with integrated power generation, according to exemplary embodiments of the present disclosure. As used herein, the term "integrated power generation," with reference to a vehicle, refers to the vehicle including structure integrated therein/therewith for producing power, such as electrical power. As illustrated, the vehicle 100 includes a frame 102. The frame 102 has been simplified in illustration due to the great many vehicles that can be applicable to exemplary embodiments. For example, the vehicle 100 can include a car, a truck, a sports utility vehicle, a motorcycle, a commercial tractor trailer truck, and/or any other suitable vehicle, including but not limited to trains. Furthermore, the vehicle 100 can include a bicycle, a tricycle, or another pedaled vehicle. Moreover, the vehicle 100 can include a passive vehicle, such as a trailer coupled to a powered vehicle or the non-powered wheels of a train. These and other variations should be understood to be within the scope of this disclosure. One or more specific implementations of the present disclosure are described below with reference to FIGS. 5 through 7.

As further shown, the vehicle 100 includes a wheel assembly 104 coupled to the frame 102. For example, the wheel assembly 104 may be bolted, welded, or otherwise fixedly attached to the frame 102. Furthermore, although not illustrated, the wheel assembly 104 may be in suspension attachment to the frame 102, for example, through a suspension assembly.

The wheel assembly 104 may include a wheel 106 defining a wheel axis 108. Generally, the wheel 106 is configured to rotate about the wheel axis 108 during operation of the vehicle. For example, a drive shaft coupled to a transaxle or transmission may be used to rotate the wheel 106. For further example, mere motion forward or backward of the vehicle 100 may rotate the wheel 106 due to contact with the ground. As further illustrated, the wheel assembly 104 also includes supporting components 105 (such as struts, rods, upper arms, lower arms, spindles, etc.) fixed about the wheel axis 108 during operation of the vehicle 100. The wheel 106 may be rotatably coupled to the supporting components 105 through one or more bearings, and the supporting components 105 may be attached to the frame 102.

The vehicle 100 may also include a power generating unit 110. Generally, the power generating unit 110 includes a rotating assembly 112 rotatable with the wheel 106 about the wheel axis 108. The rotating assembly 112 includes at least one of a magnet assembly or a coil assembly (illustrated in FIG. 3A). As will be described in greater detail below, the rotating assembly 112 (i.e., magnet assembly or coil assembly) of the power generating unit 110 included with, or coupled to, the wheel 106 may not extend 360 degrees about the wheel axis 108. Accordingly, for the embodiment depicted, the wheel 106 further includes balancing weights 115 positioned opposite the rotating assembly 112 to facilitate even rotation of the wheel 106. According to at least one exemplary embodiment, however, the balancing weights 115 may be replaced with an additional magnet or coil assembly to facilitate even rotation of the wheel 106. It is also noted that balancing weights 115 may be omitted in some implementations.

Referring still to FIG. 1, the power generating unit 110 further includes a stationary assembly 116 mounted to at least one of the supporting components 105 of the wheel assembly 104 or the frame 102. In this manner, the stationary assembly 116 is coupled to a part (e.g., at least one of the supporting components 105) of the vehicle 100 that is stationary relative to rotation of the wheel 106 such that the stationary assembly 116 does not contact a wheel axle. The stationary assembly 116 includes the other of the magnet assembly or the coil assembly. More clearly, if the rotating assembly 112 includes magnet assembly, then the stationary assembly 116 will include the coil assembly. Similarly, if the rotating assembly 112 includes the coil assembly, then the stationary assembly 116 will include the magnet assembly. In this manner, rotation of the wheel 106 rotates the rotating assembly 112 relative to the stationary assembly 116 for generating electrical power through the coils.

Specifically, for the embodiment depicted, the rotating assembly 112 includes the magnet assembly 113 and the stationary assembly 116 includes the coil assembly 117. For the embodiment shown, the magnet assembly 113 includes three individual magnets 113', which may be permanent magnets or electro magnets. Further for the embodiment shown, the coil assembly 117 includes three individual coils 117'. In such a manner, the entirety of the magnet assembly 113 (and all of the magnets 113') occupy an angular range of the wheel 106 less than about 90 degrees, such as less than about 45 degrees, as will be explained in greater detail below with reference to FIG. 3B. Similarly, the entirety of the coil assembly 117 occupies an angular range less than less than about 90 degrees, such as less than about 45 degrees. No other coils or magnets of the power generating unit 100 lie outside of these respective angular ranges.

It will be appreciated, however, that in other exemplary embodiments, the magnet assembly 113 may include any other suitable number or configuration of magnets 113' and similarly the coil assembly 117 may include any other suitable number or arrangement of coils 117'.

Generally, the power generated may be accessed and selectively controlled with a controller 120. The controller 120 may be a specialized controller, simplified computer apparatus, or analog controller. The controller 120 may include one or more power electronics or other features for conditioning the electric power generated through the power generating unit 100 (e.g., to modify a voltage and/or current of the electric power, convert from alternating current to direct current or vice versa, etc.). The controller 120 is operable with the power generating unit 110 to selectively operate the power generating unit 110 to generate electrical power. Additionally, the controller 120 is operative to completely shut off the power generating unit 110, or completely turn on the power generating unit 110.

As additionally illustrated, the vehicle 100 can include an electric energy storage unit 122 configured to store electrical energy. As shown, the power generating unit 110 is in electrical communication with the electric energy storage unit 122 for providing electrical power to the electric energy storage unit 122. The electrical power can be stored in a single cell or multiple cells of the electrical energy storage unit 122. According to at least one exemplary embodiment, the electrical energy storage unit 122 comprises at least one rechargeable battery, such as a lead-acid battery, lithium-ion battery, nickel-metal-hydride battery, or any other suitable batter. According to some exemplary embodiments, the electrical energy storage unit 122 comprises at least one capacitor cell, such as an electrolytic capacitor cell or supercapacitor cell.

As described above, a vehicle with integrated power generation may include a frame, a wheel assembly coupled to the frame, and a power generating unit. As the wheel rotates a rotating assembly of the power generating unit is brought into proximity with stationary assembly such that changing magnetic flux induces a current, thereby providing electrical power accessible at the individual wheel or wheel assembly. However, vehicles may also include multiple wheels, with two or more wheels having integrated power generating units.

Figure 2:
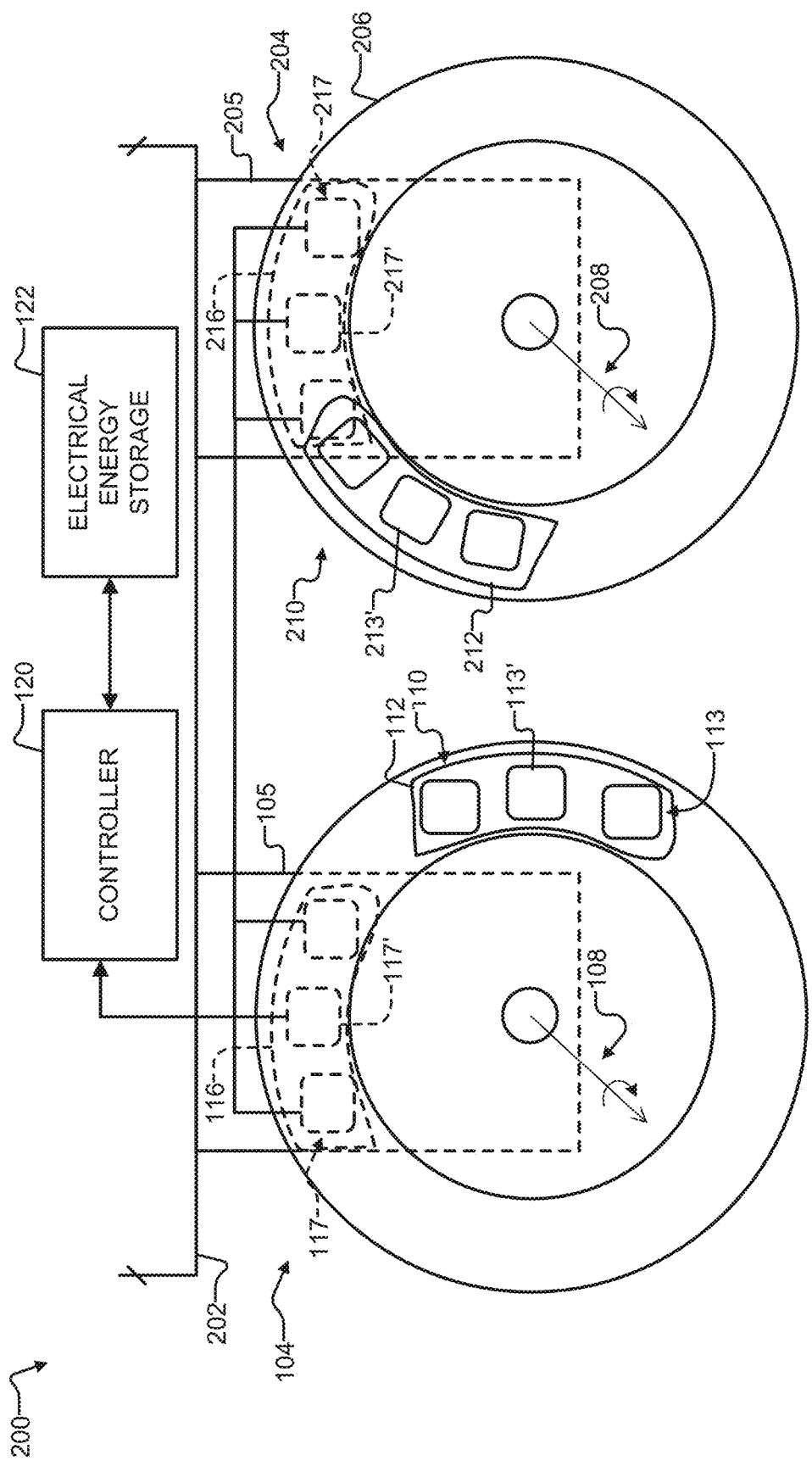
FIG. 2 is a schematic of a portion of a vehicle with multiple wheels having integrated power generation, according to exemplary embodiments of the present disclosure.

FIG. 2 is a schematic of a portion of a vehicle 200 with multiple wheels having integrated power generation, according to exemplary embodiments of the present disclosure. It is noted that exhaustive description of the same or similar components as those described in detail with reference to FIG. 1 are omitted herein for the sake of brevity and clarity of disclosure.

As shown in FIG. 2, the vehicle 200, in addition to the first wheel assembly 104 and power generating unit 110, includes a second wheel assembly 204 coupled to frame 202. The second wheel assembly 203 includes a second wheel 206 defining a second wheel axis 208. The second wheel 206 is also configured to rotate about the second wheel axis 208 during operation of the vehicle 200. Additionally, the second wheel assembly 204 also includes supporting components 205 fixed about the second wheel axis 208 during operation of the vehicle 200.

As further shown, the vehicle 200 further includes a second power generating unit 210. It is noted that although particularly illustrated as having only two wheel assemblies and power generating units, the same may be varied in many ways. For example, two or more wheel assemblies with associated power generating units may be included, without departing from the scope of this disclosure. For instance, this may be beneficial in the instance of multiple train wheels spread across many train carriages, or other suitable scenarios.

Referring still to FIG. 2, the second power generating unit 210 includes a second rotating assembly 212 rotatable with the second wheel 206 about the second wheel axis 208. As illustrated, for clarity, the second rotating assembly 212 is shown to be rotating into a power-generating position as compared to the first rotating assembly 112. The same power-generating position repeats on a cycle dependent upon wheel rotation. The second rotating assembly includes at least one of a second magnet assembly 213 or a second coil assembly 217, similarly to those assemblies 113, 117 described with reference to FIG. 1.

Finally, the second power generating unit 210 also includes a second stationary assembly 216 mounted to at least one of the supporting components 205 of the second wheel assembly 204 or the frame 202. The second stationary assembly includes the other of the second magnet assembly 213 or the second coil assembly 217, such that differing components are used in either assembly, as explained in detail above.

Figure 3A:
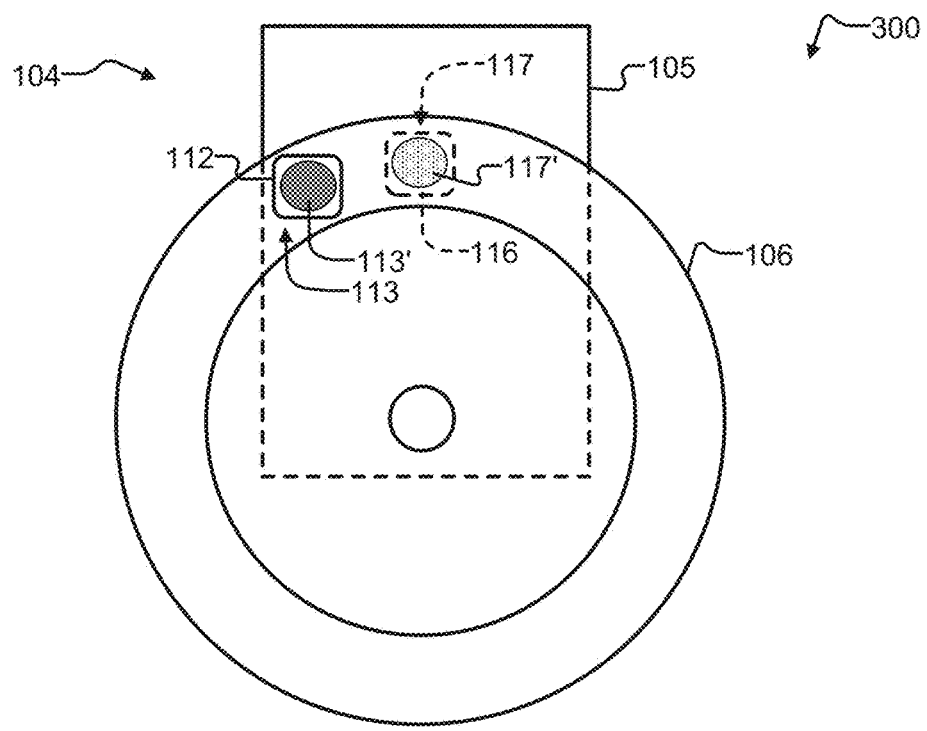
FIG. 3A is a simplified view of a wheel assembly, according to exemplary embodiments of the present disclosure.
Figure 3B:
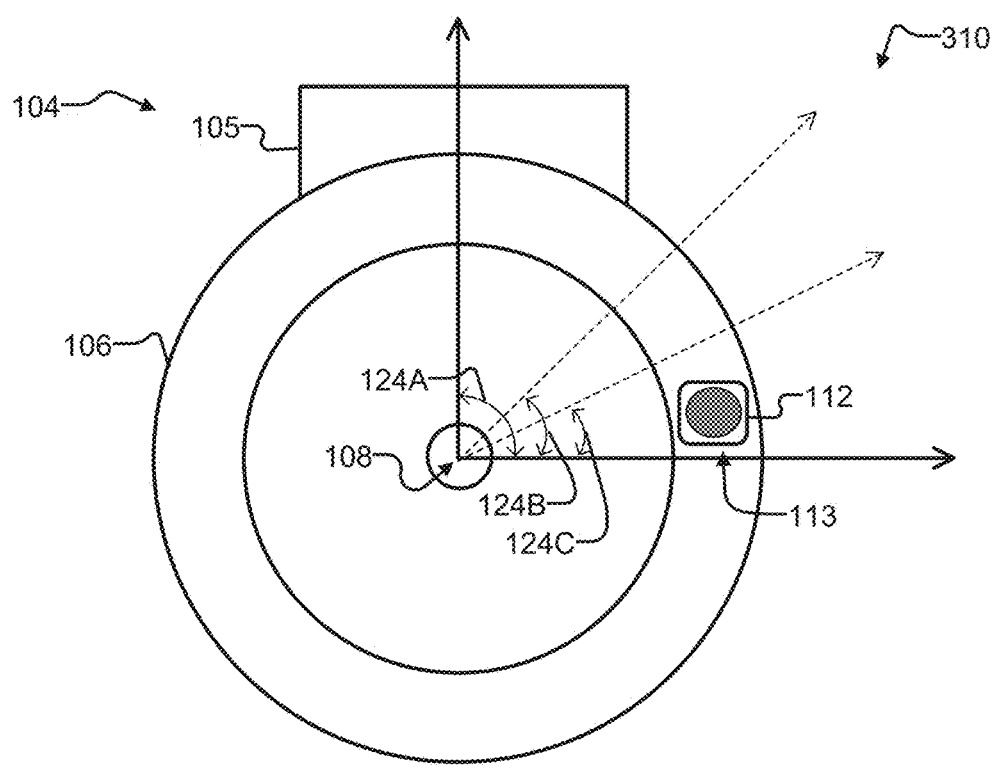
FIG. 3B is a simplified view of a wheel assembly, according to exemplary embodiments of the present disclosure.

As noted above, in certain exemplary embodiments, the magnet assembly 113 may include any suitable number of magnets 113' and the coil assembly 117 may include any suitable number of coils 117'. Referring now to FIG. 3A, a simplified view 300 is provided of a wheel assembly 104, according to exemplary embodiments of the present disclosure. As explained above, each of the rotating assembly 112 and the stationary assembly 116 includes either a magnet assembly 113 or a coil assembly 117. As shown in detail here, the magnet assembly 113 includes a single magnet 113' and the coil assembly 117 includes a single coil 117'. As with the embodiment described above, the magnet assembly 113 is included with the rotating assembly 112 and the coil assembly is included with the stationary assembly 116. However, in other embodiments, the positioning of the magnet and coil assemblies 113, 117 may be reversed. With such a configuration, the exemplary power generating assembly 100 does not include any other magnets 113' or coils 117' operable with the wheel assembly 104 outside the magnet and coil assemblies 113, 117 shown.

As also noted above, in certain exemplary embodiments, the rotating assembly 112 and stationary assembly 116, including the magnet assembly 113 and coil assembly 117, may not extend completely about an axis 108 of the wheel 106. For example, referring now to FIG. 3B, a wheel assembly 104 is provided including a power generating unit 100 with a rotating assembly 102 extending less than three hundred and sixty degrees about the axis 108. Specifically, the exemplary rotating assembly 102 (which may include one of a coil assembly or magnet assembly, and more specifically includes a single magnet assembly 113 for the embodiment shown) extends less than about ninety degrees about the wheel axis 108, such as less than about forty-five degrees about the wheel axis 108, such as less than about thirty degrees about the wheel axis 108. These angular ranges are noted in FIG. 3B by range 124A (90 degrees), range 124B (45 degrees), and range 124C (30 degrees), respectively. Although the rotating assembly 112 is described in such a manner in FIG. 3B, it will be appreciated that the stationary assembly 116 may extend in a similar manner (i.e., extend less than about ninety degrees about the wheel axis 108, such as less than about forty-five degrees about the wheel axis 108, such as less than about thirty degrees about the wheel axis 108).

It will be appreciated that although the rotating assembly 112 and stationary assembly 116 are each described as extending less than 360 degrees about the axis 108 of the wheel 106, in other embodiments, one or both of the rotating assembly or stationary assembly may extend further than ninety degrees about the axis 108, such as up to 360 degrees about the axis 108. For example, in certain embodiments both the rotating and stationary assemblies 112, 116 may extend up to 360 degrees, or only one of the rotating assembly 112 or the stationary assembly 116 may extend up to 360 degrees. In such a manner, the magnet assembly 113 may extend farther about the axis 108 than the coil assembly 117, or vise versa.

As presented above, the systems and apparatuses described above may be operated selectively, for example, according to any suitable methodology, as further described below.

Figure 4:
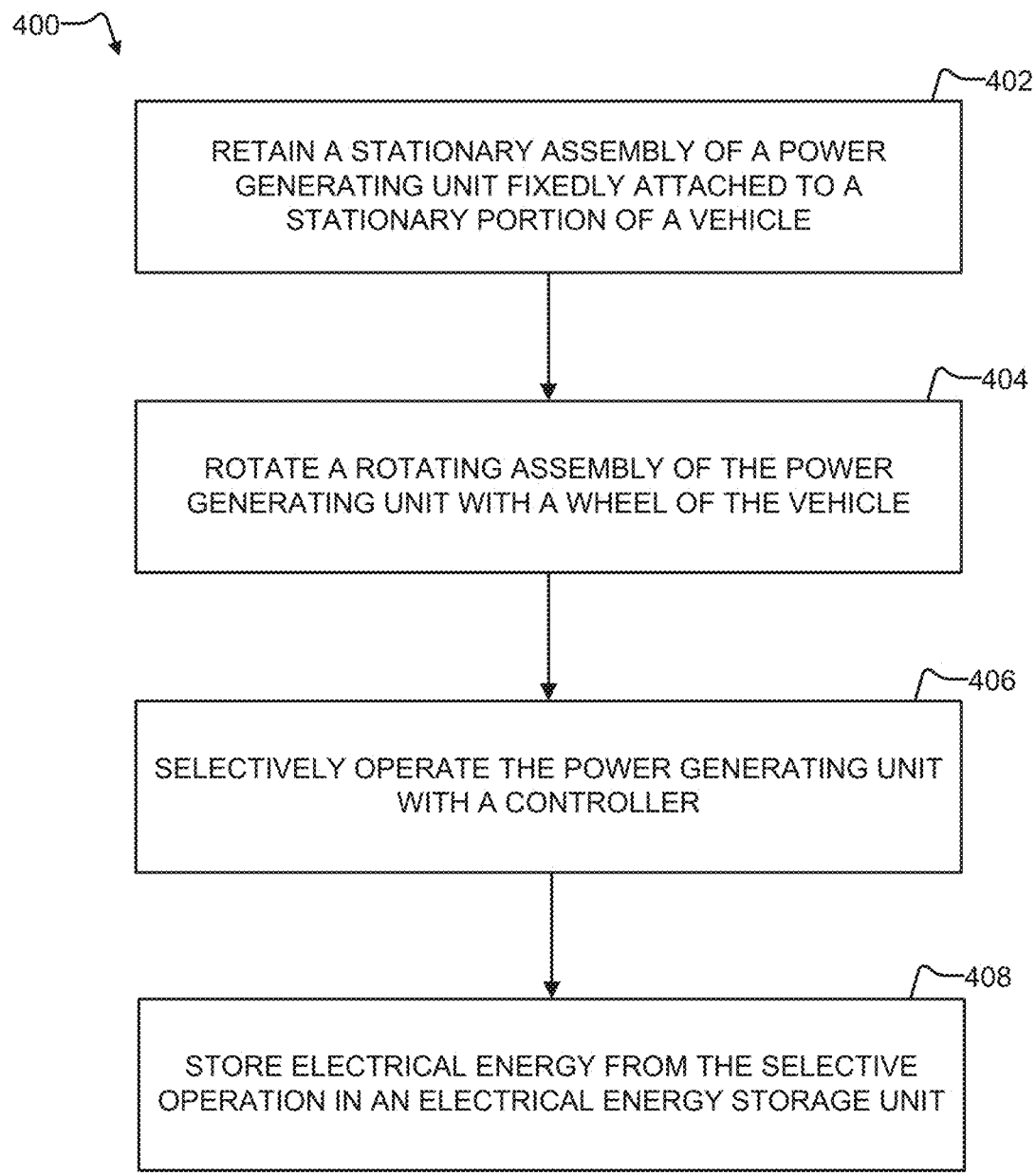
FIG. 4 is a flowchart of a method of integrated power generation in a vehicle using induced currents from vehicle wheel rotation, according to exemplary embodiments of the present disclosure.

FIG. 4 is a flowchart of a method 400 of integrated power generation in a vehicle, according to exemplary embodiments of the present disclosure. The method 400 includes retaining a stationary assembly of a power generating unit fixedly attached to a stationary portion of a vehicle, at block 402. The method 400 also includes rotating a rotating assembly of the power generating unit, relative to the stationary assembly, using the wheel of the vehicle, at block 404.

As explained above, the relative motion between the two assemblies is used to generate electrical power. Thus, the method 400 further includes selectively operating the power generating unit with a controller, at block 406. Finally, the method 400 includes storing electrical energy from the selective operation of the power generation unit in an electrical energy storage unit, at block 408.

Figure 5:
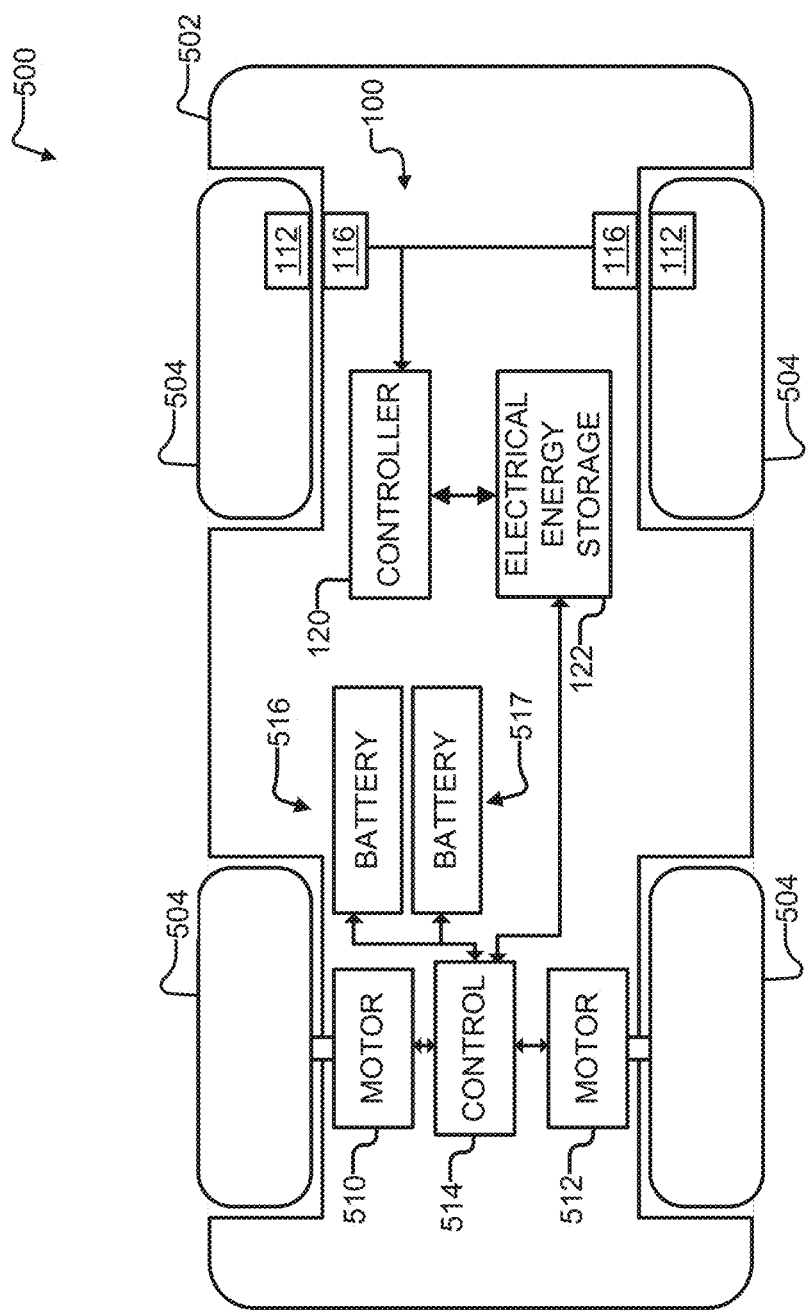
FIG. 5 is a schematic of an electric vehicle with integrated power generation using induced currents from vehicle wheel rotation, according to exemplary embodiments of the present disclosure.
Figure 6:
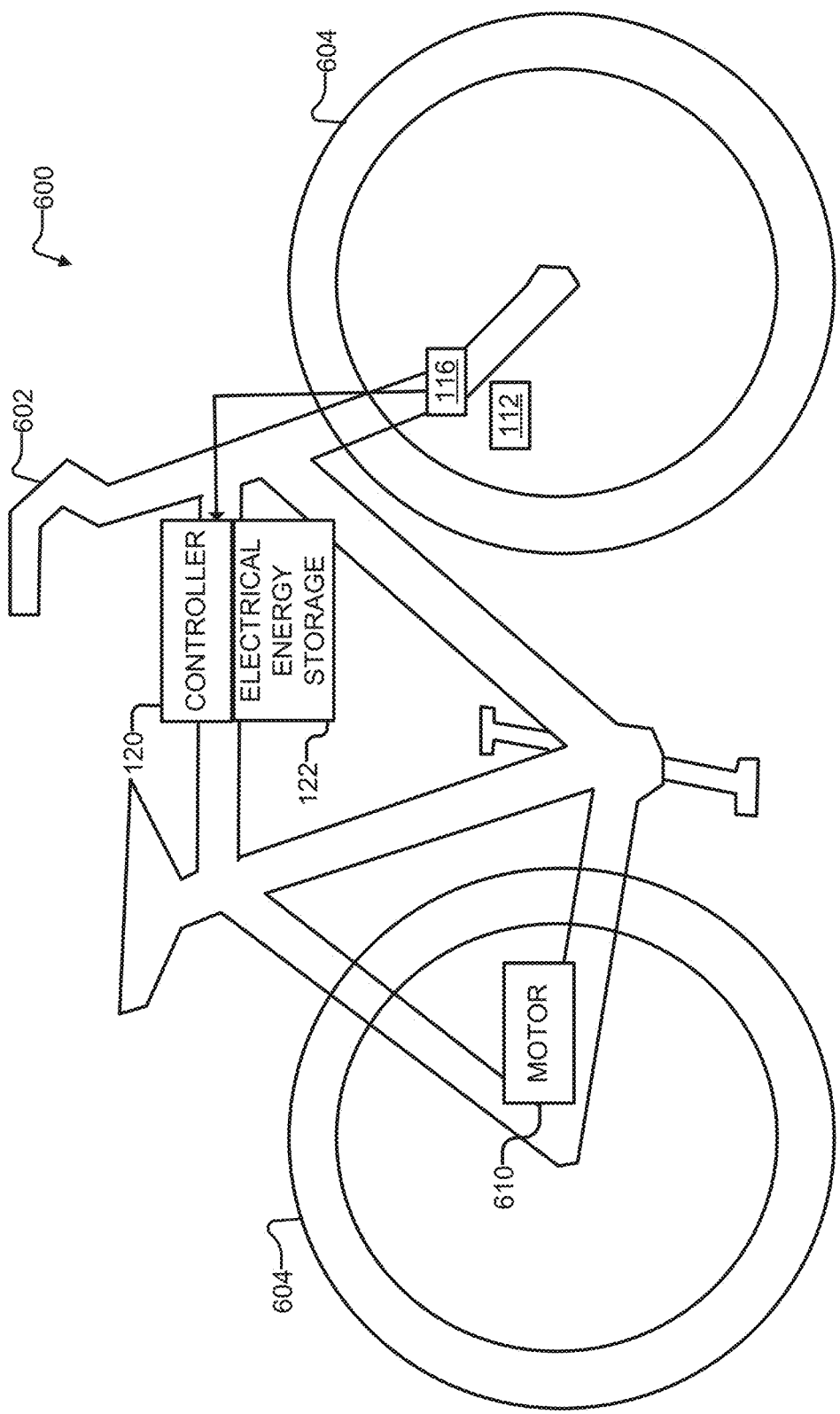
FIG. 6 is a schematic of a bicycle with integrated power generation using induced currents from vehicle wheel rotation, according to exemplary embodiments of the present disclosure.
Figure 7:
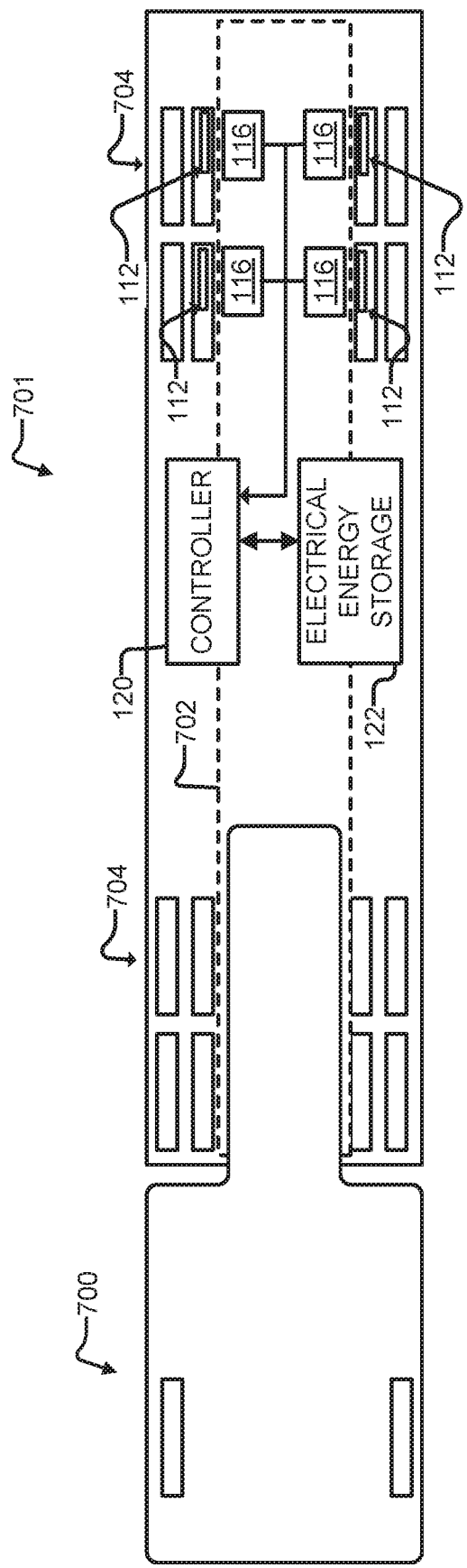
FIG. 7 is a schematic of a large truck trailer with integrated power generation using induced currents from vehicle wheel rotation, such as an 18-wheeler truck or a 16-wheeled trailer, according to exemplary embodiments of the present disclosure.

Referring now to FIGS. 5 through 7, various specific embodiments of the present disclosure are depicted.

As shown in FIG. 5 an electric vehicle 500 can include a chassis 502 and rotating wheels 504. Furthermore, the system 100 may be integrated therein such that the controller 120 and electrical energy storage 122 are arranged within or on the chassis 502. Moreover, rotating assemblies 112 and stationary assemblies 116 may be arranged to provide electrical power through rotation of at least one wheel 504.

The electric vehicle 500 may also include an electric motor 510, controller 514, and one or more battery packs 516, 517. It is noted that during certain operations, or under certain conditions, the system 100 can communicate electrical power to the controller 514 for use by motors 510 and/or storage at the battery packs 516, 517. Turning now to FIG. 6 a bicycle 600 with integrated power generation is shown. As illustrated, the bicycle 600 may include a frame 602 and rotating wheels 604. The bicycle 600 may also include a motor 610 coupled to a rear wheel to assist with propelling the bicycle 600. As further shown, the system 100 may be integrated onto the frame 602 and wheel 604 such that electrical power generated at stationary member 116 is communicated to the controller 120 for storage at electrical energy storage 122, or provided to motor 610.

Turning now to FIG. 7 a truck 700 with a trailer 701 coupled thereto having integrated power generation is shown. As illustrated, the trailer 701 may include a frame 702 and rotating wheels 704. The trailer 701 may also include the system 100 integrated thereon that electrical power generated at stationary member 116 is communicated to the controller 120 for storage at electrical energy storage 122. For the embodiment shown, the stationary assemblies 116 are mounted to the frame 702 of the trailer 701, such as directly to the frame 702 of the trailer 701.

While the present subject matter has been described in detail with respect to specific exemplary embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A vehicle comprising:
   a vehicle frame;
   a wheel assembly coupled to the vehicle frame and comprising a wheel that is rotatable about a wheel axis, the wheel defining a geometric cylinder, the wheel having two opposing outer surfaces defined by the geometric cylinder, the wheel configured to rotate about the wheel axis during operation of the vehicle, the wheel assembly further comprising supporting components fixed non-rotatably with respect to the vehicle frame during operation of the vehicle;
   a power generating unit comprising:
   a rotating assembly rotatable with the wheel about the wheel axis and comprising a magnet assembly that is directly attached to one of the two outer surfaces of the wheel, and includes at least one magnet attached to and touching the wheel without any intervening structure between the at least one magnet and the wheel; and
   a stationary assembly coupled to a part of the vehicle that is stationary relative to rotation of the wheel such that it does not contact a wheel axle, the stationary assembly comprising a coil assembly such that rotation of the wheel rotates the rotating assembly relative to the stationary assembly for generating electrical power, the coil assembly being located entirely outside the geometric cylinder defined by the wheel;
   an electric motor being configured to propel the vehicle with at least a portion of the generated electrical power;
   wherein the vehicle is at least one of a car, a truck, a sports utility vehicle, or a commercial tractor trailer truck.

2. The vehicle of claim 1, further comprising:
   an electric energy storage unit, wherein the power generating unit is in electrical communication with the electric energy storage unit for providing electrical power to the electric energy storage unit.

3. The vehicle of claim 1, further comprising:
   a controller, wherein the controller is operable with the power generating unit to selectively operate the power generating unit to generate electrical power.

4. The vehicle of claim 1, wherein the coil assembly comprises a single coil.

5. The vehicle of claim 1, wherein the coil assembly comprises a plurality of coils and wherein the magnet assembly comprises a plurality of magnets.

6. The vehicle of claim 1, wherein the wheel assembly of the vehicle is a first wheel assembly, wherein the power generating unit is a first power generating unit, and wherein the vehicle further comprises:
   a second wheel assembly coupled to the vehicle frame and comprising a second wheel defining a second wheel axis, the second wheel configured to rotate about the second wheel axis during operation of the vehicle, the second wheel assembly further comprising supporting components fixed about the second wheel axis during operation of the vehicle; and
   a second power generating unit comprising a second rotating assembly rotatable with the second wheel about the second wheel axis and comprising at least one of a second magnet assembly or a second coil assembly, and a second stationary assembly mounted to at least one of the supporting components of the second wheel assembly or the vehicle frame and comprising the other of the second magnet assembly or the second coil assembly.

7. The vehicle of claim 6, wherein the second rotating assembly comprises the second magnet assembly, and wherein the second stationary assembly comprises the second coil assembly.

8. The vehicle of claim 6, wherein the second coil assembly comprises a single coil.

9. The vehicle of claim 6, wherein the second magnet assembly comprises a single magnet.

10. The vehicle of claim 1, wherein the vehicle comprises an electric vehicle or a gas-electric hybrid vehicle.

11. A vehicle comprising:
a vehicle frame;
a wheel assembly coupled to the vehicle frame and comprising a wheel that is rotatable about a wheel axis, the wheel defining a geometric cylinder, the wheel having two opposing outer surfaces defined by the geometric cylinder, the wheel configured to rotate about the wheel axis during operation of the vehicle, the wheel assembly further comprising supporting components fixed non-rotatably with respect to the vehicle frame during operation of the vehicle;
a power generating unit comprising:
a rotating assembly rotatable with the wheel about the wheel axis and comprising a magnet assembly that is directly attached to one of the two outer surfaces of the wheel, and includes at least one magnet attached to and touching the wheel without any intervening structure between the at least one magnet and the wheel; and
a stationary assembly coupled to a part of the vehicle that is stationary relative to rotation of the wheel such that it does not contact a wheel axle, the stationary assembly comprising a coil assembly such that rotation of the wheel rotates the rotating assembly relative to the stationary assembly for generating electrical power, the coil assembly being located entirely outside the geometric cylinder defined by the wheel; and
wherein the vehicle is at least one of a car, a truck, a sports utility vehicle, or a commercial tractor trailer truck.

* * * * *